May 22, 1928.  W. HAHNEMANN  1,670,888
SUBMARINE SOUND RECEIVER
Filed Sept. 30, 1920
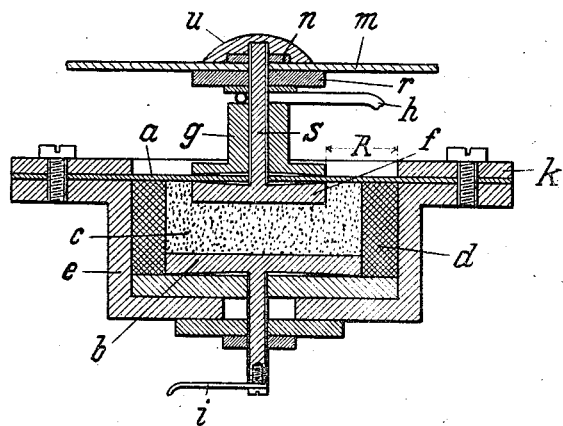

Patented May 22, 1928.

1,670,888

UNITED STATES PATENT OFFICE.

WALTER HAHNEMANN, OF KITZEBERG, NEAR KIEL, GERMANY, ASSIGNOR TO THE FIRM SIGNAL GESELLSCHAFT M. B. H., OF KIEL, GERMANY.

SUBMARINE SOUND RECEIVER.

Application filed September 30, 1920, Serial No. 413,944, and in Germany October 7, 1914.

This invention relates to submarine sound receiving devices which consist of a tuned body or structure that collects or takes in the sound waves and a sound detecting device coupled to the said body or structure.

The perception underlying the invention is that in a receiving device of this kind not only the natural rate of vibration of the sound collecting structure that takes in the sound waves, but also the natural rate of vibration of the detecting device, should not be arbitrary. The detecting device should be tuned to a certain natural tone, and should act in accordance with this tuning when used. If two previously tuned vibratory structures of the said kind are coupled to each other a resonance curve will be obtained with two different maxima or crests the positions of which are determined by the natural periodic time of the individual vibratory structures and the nature of the coupling between them.

But in submarine sound receivers of the said kind the evil has hitherto existed that the acoustic properties of the receiver changed when the detecting devices in the apparatus were exchanged; because it was not taken into consideration that these detectors themselves acted as vibratory structures and as such possessed certain characteristics of their own, and because the tuning of the individual parts in different detecting devices of one and the same type was not at all uniform. Besides, in submarine sound signalling devices in which detectors are used that possess imperfect pressure contacts, the acoustic properties of the parts of the device change while the devices are in use, where no measures are adopted to keep their individual tunings permanently constant. These facts are particularly annoying when the parts of the detector are used in conjunction with acoustic structures such as tuning forks that are tuned to a certain tone. If, for example, a detector of this kind is mounted between the two prongs of a tuning fork—when the changes of pressure against the detector due to the prongs vibrating in opposite directions will be utilized for the function of the receiving—a combined resonance will occur in the receiving system which, of course, will be partially determined by the nature of the vibrations of the detector structure and will therefore change as the nature of these vibrations changes. It is thus seen that here also the changes in the individual tuning of the detector have to be taken into consideration.

The object of this invention is to remove the afore-mentioned drawbacks of the known structures employed in receiving devices, and this is accomplished by a certain combination of certain measures in producing the receivers. It consists more particularly in tuning both the body or structure that takes in the sound waves (diaphragm), and the detector, of each device in such a manner as to cause each to execute certain predetermined natural rates of vibration, which, when the two tuned structures are coupled together to a certain degree, will give a receiving system or device having two frequencies of resonance, one of which will coincide with the tone used for signalling. Hence in accordance with the invention the treatment to which the detector is subjected during its production is such that the predetermined natural rate of vibration will be the immediate result of the elasticity and dimensions of its parts and of its design, so that the said rate of vibration of all such detectors, if made of the same material and having the same dimensions, will always recur. These premises, and a due consideration of the degree of the acoustic coupling between the detector and the tuned sound collecting member when effecting the tuning, are necessary if the position of the crest in the resonance curve is to remain unchanged when the detector of the receiving device is replaced. In order to obtain the necessary permanency of the tuning in microphones during their operation, certain special measures which constitute features of this invention must of course be carried out in producing the same. In accordance with the invention the flanges that grip the edge of the microphone diaphragm are ground upon each other to provide perfectly smooth and uniform contacting or gripping surfaces for the diaphragm, so that it may be gripped firmly; the electrode plate to be fixed on the middle of the diaphragm, or the holding nut therefor, or both, are provided with a concave or hollow contacting surface, so that a well defined edge of this surface bears against the diaphragm; and the area of the unrestrained or freely vibrating surface of the diaphragm is always kept perfectly constant. In microphonic detectors in which an electrode bears against the casing of the device, the bearing surface of this electrode is also made hollow so that a sharp or well defined edge of the same is pressed against the casing in order to obtain a close and uniform contact.

A constructional form of a submarine sound receiver constructed in accordance with the above-described method is shown in the drawing which represents a device in which a microphone with an elastic supporting member is used as a detector.

In said drawings, $a$ is the supporting member which is made in the form of a diaphragm and which, together with the opposite electrode $b$, form boundaries on two sides of the granular contents $c$ and keep them in position. The granular contents $c$ act as a variable resistance connecting element that establishes an electrical connection between the two electrodes $f$ and $b$. The lateral boundary of the granule chamber is formed of a soft ring $d$ which is formed of felt or silk and bears against the casing $e$. The second electrode is formed in the shape of a disk $f$ which is fixed at the middle of the diaphragm by means of a nut $g$. The threaded stem $s$ that carries the nut $g$ also serves to connect the microphone with the tuned diaphragm $m$ that collects or takes in the sound waves. To this end the threaded stem $s$ is made to pass through the diaphragm $m$ and is held in position by a nut $n$. $u$ is a metal seal on the outside of the diaphragm and $r$ a washer on the inside of the diaphragm. Connected externally to the electrodes of the microphone are the wires $h$, $i$ that carry the current whose strength is altered by the changes of resistance produced by alterations of the pressure exerted on the granules with which the chamber $c$ is filled. The surface of the electrode $f$ that bears against the supporting plate $a$ is hollow or concave, as indicated in the drawing, so that it is pressed into firm contact with the diaphragm when the nut $g$ is screwed fast. The supporting plate $a$ is made in the shape of a tuned diaphragm and preferably consists of a metal such as bronze. At its edge the diaphragm is fixed to the flange of the casing by means of a ring $k$. In manufacturing the detector the ring and the flange are ground upon each other, as hereinbefore mentioned, to provide even surfaces thereon so that the diaphragm may be gripped firmly and uniformly between the ring and flange and the inner edge of the ring and flange may lie close against the diaphragm. This latter feature is of importance, since if the inner edges of the ring and the flange did not lie against the diaphragm the radial distance R, representing the width of the freely vibrating or unrestrained portion of the diaphragm, would be increased and thus the tuning of the diaphragm would be changed. In the same manner, the distance R would be increased if the edges of the nut $g$ and the disc $f$ did not lie close against the diaphragm.

The bearing surface of the lower electrode is also made hollow as in the case of disc $f$, so that only its outer edge rests upon the bottom of the detector casing. In this way the position of this member within the detecting device is rendered firm and unchangeable.

The permanency of the tuning of the receiving device further will be enhanced by tuning before hand the microphonic detector to a natural rate of vibration so high that the frequency of resonance of the coupled system resulting after coupling the detecting device with the wave collecting member and corresponding to the natural rate of vibration of the detecting device is greater than the tone used for signalling. In receiving devices comprising a sound wave collecting diaphragm and a microphonic detector, the natural rate of vibration of the diaphragm preferably will be chosen so that the frequency of resonance of the receiving device which corresponds to the rate of vibration of the diaphragm coincides with the tone used for signalling. In this case it is necessary that the frequency of the natural rate of vibration of the diaphragm be higher than the frequency of the tone used for signalling. Advantageously the frequency of the natural rate of vibration of the microphonic detector then will be chosen so as to be higher than the frequency of the diaphragm by approximately the same amount as the latter is higher than the tone used for signalling.

I claim:

1. In a submarine sound receiver, a sound collecting member, and a detector, said sound collecting member and said detector each being individually tuned and means for coupling them together acoustically the dominant frequencies of resonance of the coupled system embracing the frequency used for signaling.

2. In a submarine sound receiver, a sound collecting member, and a detector, said sound collecting member and said detector each being individually tuned and means for coupling them together acoustically one of the two dominant frequencies of resonance of the coupled system coinciding with the frequency used for signaling.

3. In a submarine sound receiver, a sound receiving diaphragm and a microphonic detector, said diaphragm and said detector each being individually tuned and means for acoustically coupling them together one of the two dominant frequencies of resonance of the coupled system coinciding with the frequency used for signaling.

4. In a submarine sound receiver, a sound collecting member and a detector, said sound collecting member and said detector each being individually tuned and means for acoustically coupling them together one of the two dominant frequencies of resonance of the coupled system, namely the frequency corresponding to the detector, being higher than the frequency used for signaling.

5. In a submarine sound receiver, a sound collecting member and a detector, said sound collecting member and said detector each being individually tuned and means for acoustically coupling them together one of the two dominant frequencies of resonance of the coupled system, namely the frequency corresponding to the sound collecting member, coinciding with the frequency used for signaling.

6. In a submarine sound receiver, a sound collecting diaphragm, and a microphonic detector, said diaphragm being individually tuned to a frequency higher than that used for signaling, said detector being individually tuned to a frequency higher than that of the diaphragm by about the same amount that the frequency of the diaphragm is higher than the signaling frequency, and the tuned diaphragm and detector being acoustically coupled together in such relation that one of the two dominant frequencies of resonance of the coupled system, namely the frequency corresponding to the diaphragm, coincides with the frequency used for signaling.

7. In a tuned sound detecting microphone, a cup-like casing provided with an annular peripheral flange, a vibratory diaphragm seated on said flange, and an annular clamping member for clamping the peripheral portion of said diaphragm securely on said flange, the diaphragm-engaging surfaces of the flange and of the clamping member being ground off on each other before clamping the diaphragm therebetween so that a uniform and secure clamping effect is secured whereby the area of the freely vibratable portion of the diaphragm remains constant.

8. In a tuned sound detecting microphone, a vibratory diaphragm, and an electrode lying against and secured to the central portion of said diaphragm, said electrode having its diaphragm-engaging surface in concave form and being provided with a screw-threaded pin which passes through the diaphragm, and a nut having a concave diaphragm-engaging surface adapted to be screwed onto said pin and against said diaphragm to firmly clamp the diaphragm between the electrode and the nut in such manner that the clamped area of the diaphragm does not vary during vibration of the diaphragm.

9. A device according to claim 8 in which the boundaries of the clamping surfaces of the electrode and the nut are in alinement.

10. A microphone comprising a casing provided with a supporting flange; an elastic diaphragm supported on said flange; a ring for holding the edge of the diaphragm securely against said supporting flange; said ring and said supporting flange being ground off upon each other so as to provide smooth and uniform contact with the diaphragm; an electrode secured to said casing; an oppositely disposed electrode secured to the central part of the diaphragm, said electrode comprising a plate having a concave surface in engagement with the diaphragm, a screw pin connected with the plate and passing through the diaphragm, and a nut to be screwed on the pin to draw the plate securely against the diaphragm; and carbon granules in the casing establishing connection between the two electrodes.

11. A microphone comprising a casing provided with a supporting flange; an elastic diaphragm supported on said flange; a ring for holding the edge of the diaphragm securely against said supporting flange; said ring and said supporting flange being ground off upon each other so as to provide smooth and uniform contact with the diaphragm; an electrode secured to said casing; an oppositely disposed electrode secured to the central part of the diaphragm, said electrode comprising a plate having a concave surface in engagement with the diaphragm, a screw pin connected with said plate and passing through the diaphragm, and a nut to be screwed on the pin to draw the plate securely against the diaphragm; said nut having a diameter substantially equal to that of the plate and being provided with a concave surface in engagement with the plate; and carbon granules in the casing establishing connection between the two electrodes.

12. A microphone comprising a casing provided with a supporting flange; an elastic diaphragm supported on said flange; a ring for holding the edge of the diaphragm securely against said supporting flange; said ring and said supporting flange being ground off upon each other so as to provide smooth and uniform contact with the diaphragm; an electrode secured to the central part of the diaphragm, said electrode comprising a plate having a concave surface in engagement with the diaphragm, a screw pin connected with the plate and passing through the diaphragm, and a nut to be screwed on the pin to draw the plate securely against the diaphragm; an oppositely disposed second electrode having a concave surface in contact with the casing; means for pressing said second electrode close against the casing; and carbon granules in the casing establishing connection between the two electrodes.

In testimony whereof I have affixed my signature.

WALTER HAHNEMANN.